United States Patent [19]

Araya et al.

[11] Patent Number: 4,581,211

[45] Date of Patent: * Apr. 8, 1986

[54] ZEOLITE EU-12

[75] Inventors: Abraham Araya, Merseyside, England; Barrie M. Lowe, Edinburgh, Scotland

[73] Assignee: Imperial Chemical Industries PLC, London, England

[*] Notice: The portion of the term of this patent subsequent to Apr. 8, 2003 has been disclaimed.

[21] Appl. No.: 538,433

[22] Filed: Oct. 3, 1983

[30] Foreign Application Priority Data

Oct. 4, 1982 [GB] United Kingdom ............... 8228271

[51] Int. Cl.$^4$ .............................................. C01B 33/28
[52] U.S. Cl. .................................. 423/277; 423/326; 423/328; 423/329; 502/77; 502/62
[58] Field of Search ............... 423/277, 323–333; 502/60, 77, 62

[56] References Cited

U.S. PATENT DOCUMENTS

| 3,578,398 | 5/1971 | Jenkins | 423/328 |
| 4,060,590 | 11/1977 | Whittam et al. | 423/329 |
| 4,187,283 | 2/1980 | Kokotailo et al. | 423/328 |
| 4,209,498 | 6/1980 | Whittam | 423/329 |
| 4,366,135 | 12/1982 | Le Van Mao et al. | 423/329 |
| 4,397,827 | 8/1983 | Chu | 423/328 |

FOREIGN PATENT DOCUMENTS 0021445 7/1981 European Pat. Off. ............ 423/328

*Primary Examiner*—Edward J. Meros
*Attorney, Agent, or Firm*—Cushman, Darby & Cushman

[57] ABSTRACT

A new zeolite material designated EU-12 has a molar composition expressed by the formula: 0.5 to 2.0 $R_2O$: $Y_2O_3$: at least 5 $XO_2$: 0 to 1000 $H_2O$ wherein R is a monovalent cation or 1/n of a cation of valency n, X is silicon and/or germanium, Y is one or more of aluminum, iron, chromium, vanadium, molybdenum, arsenic, antimony, manganese, gallium or boron and $H_2O$ is water of hydration additional to water notionally present when R is H, and having an X-ray powder diffraction pattern substantially as set out in Table 1. The zeolite material is prepared from a reaction mixture containing $XO_2$ (preferably silica), $Y_2O_3$ (preferably alumina) and an organic compound, most preferably a tetramethylammonium compound.

6 Claims, 4 Drawing Figures

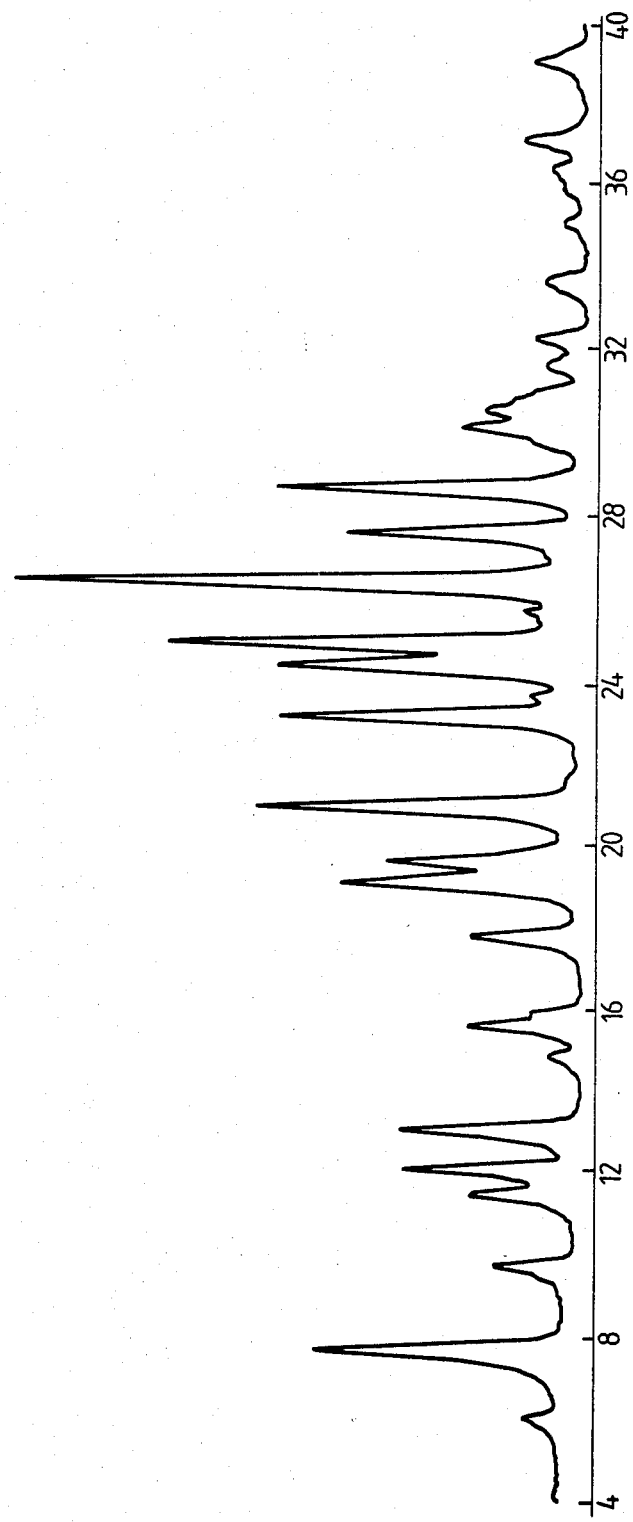
Fig. 1. X-RAY POWDER DIFFRACTION PATTERN OF EU12

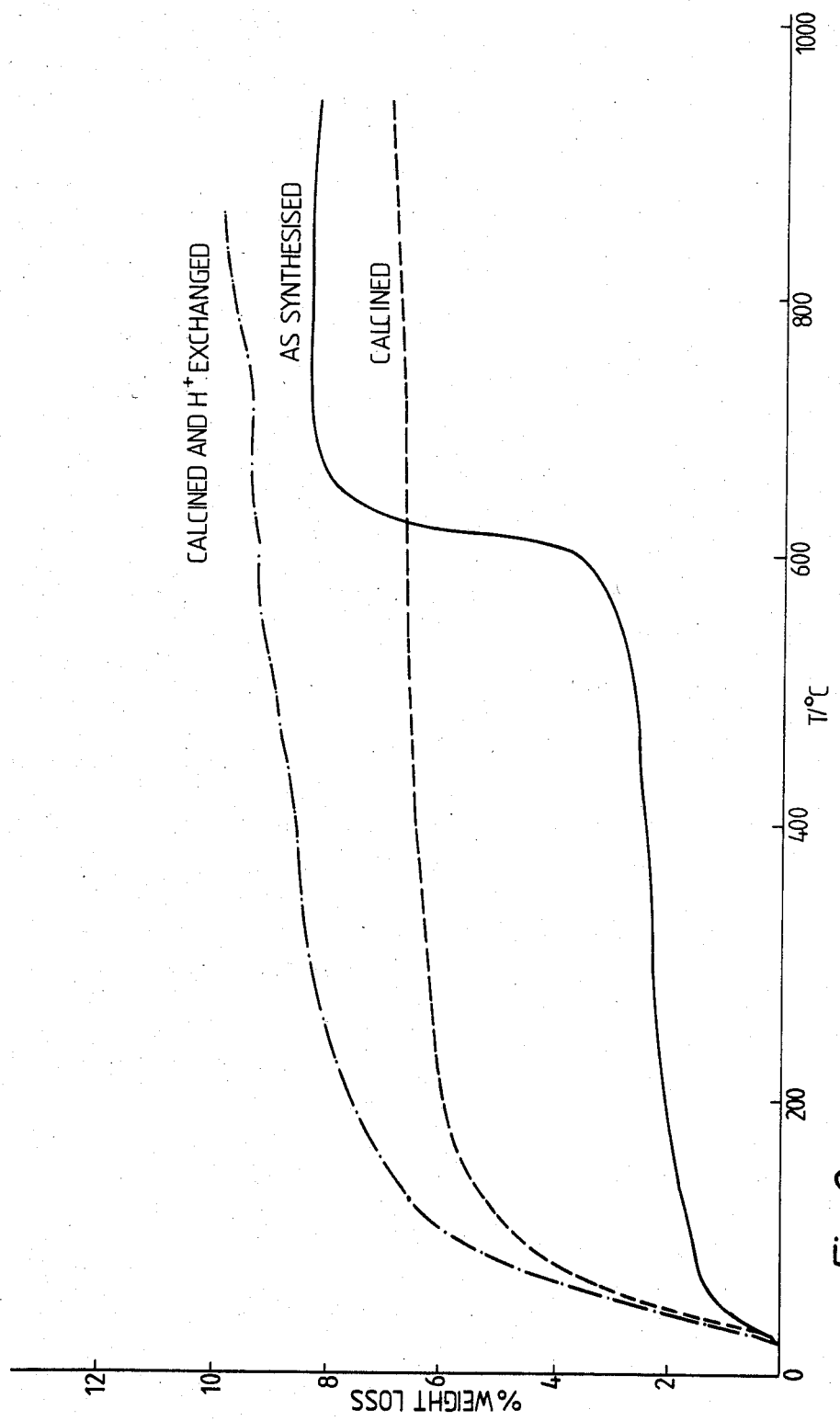
Fig. 2. TGA TRACES OF AS SYNTHESISED, CALCINED AND H⁺ EXCHANGED EU 12

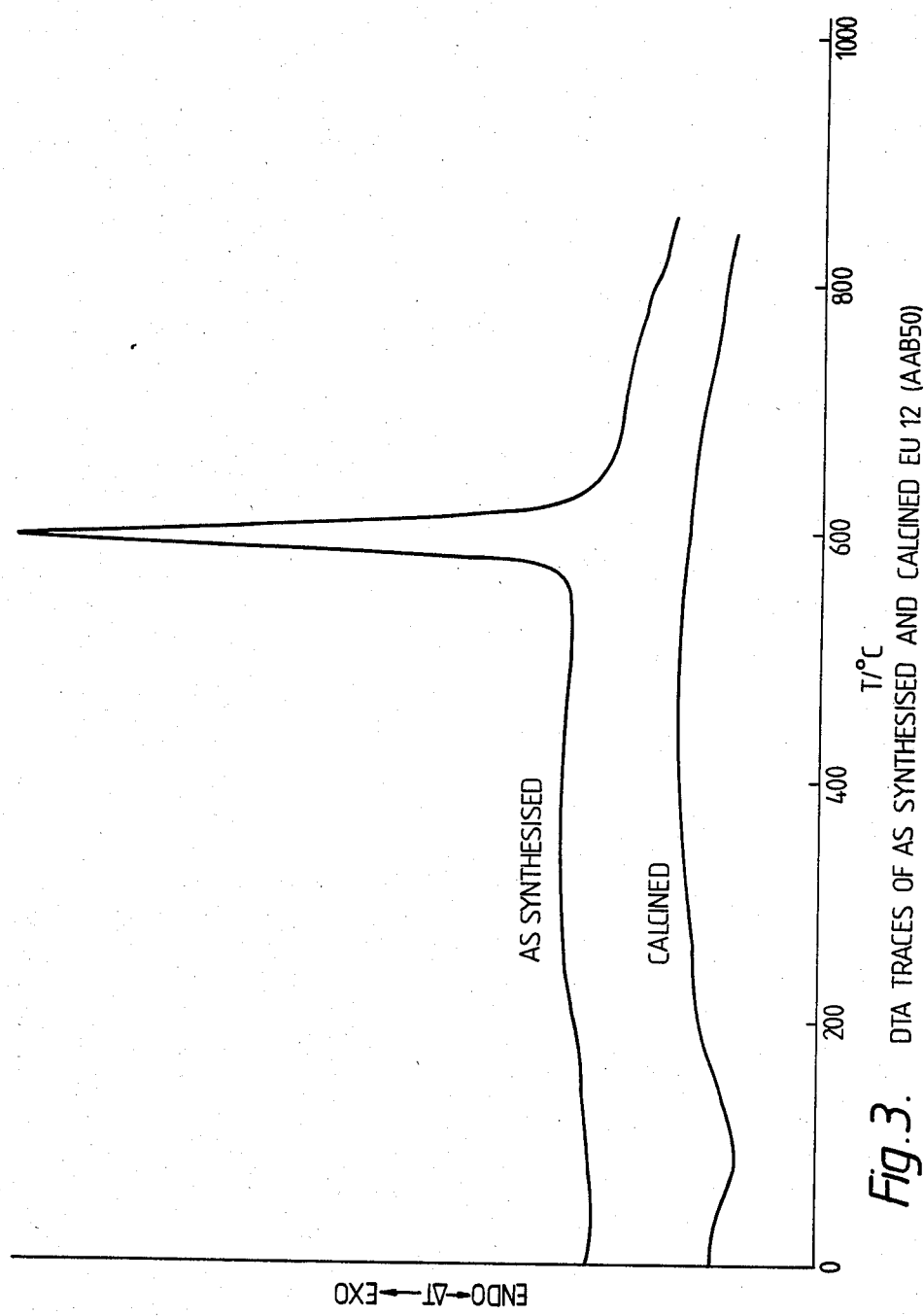

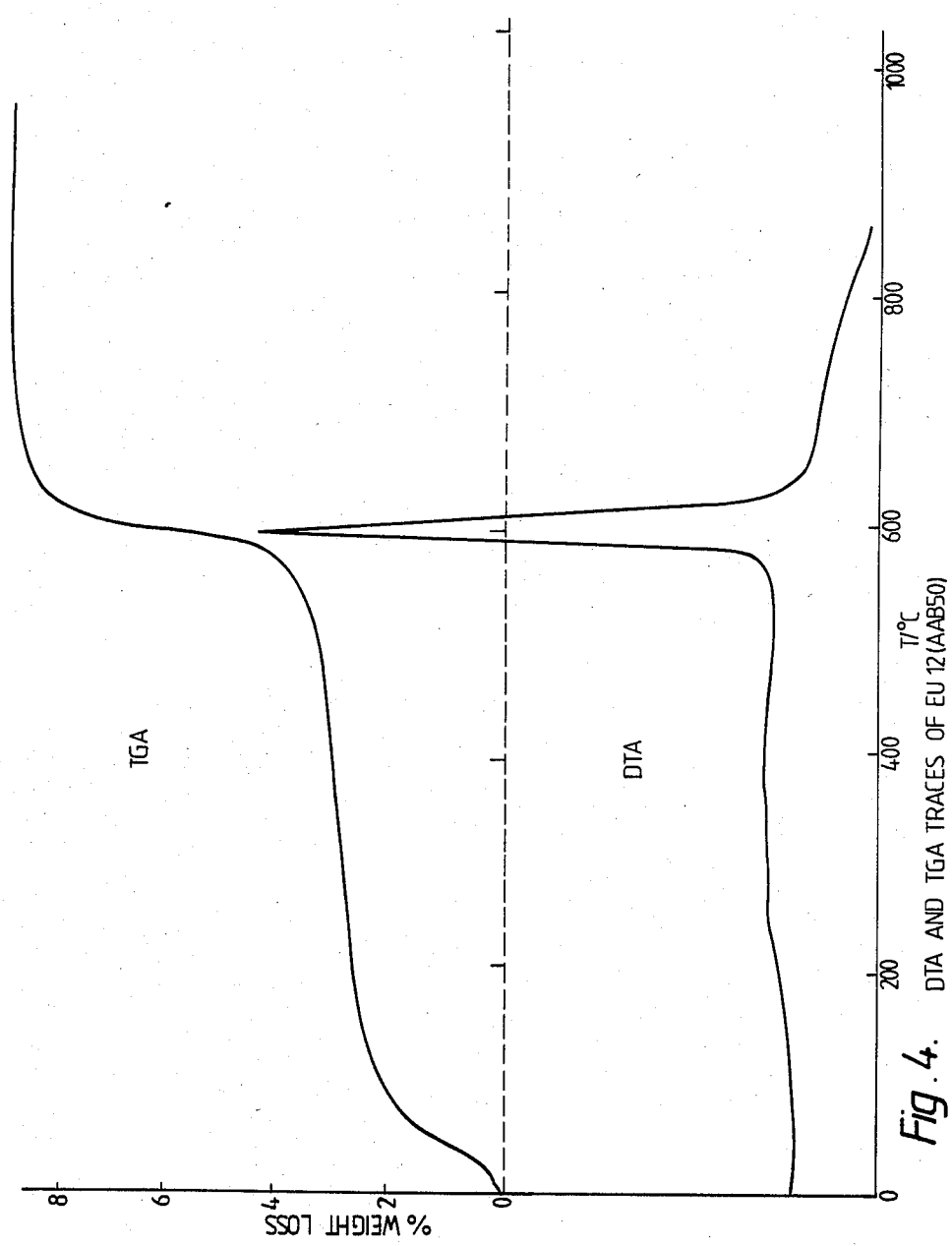
Fig. 4. DTA AND TGA TRACES OF EU 12(AAB50)

ZEOLITE EU-12

The present invention relates to a novel zeolite material, hereinafter referred to as EU-12, and to methods for its preparation.

Aluminosilicate zeolites are now widely used in industry. Some occur only in nature, others are only available as a result of chemical synthesis and some are available in both natural and synthetic forms. Synthetic zeolites are attracting more and more attention and it is becoming more and more possible to control the preparation of such zeolites so as to tailor their properties to particular needs.

According to the present invention a crystalline zeolite material, EU-12 has a composition (in terms of mole ratios of oxides) expressed by the formula:

0.5 to 2.0 $R_2O:Y_2O_3$ : at least 5 $XO_2$ : 0 to 1000 $H_2O$ wherein R is a monovalent cation or 1/n of a cation of valency n, X is silicon and/or germanium, Y is one or more of aluminium, iron, chromium, vanadium, molybdenum, arsenic, antimony, manganese, gallium or boron and $H_2O$ is water of hydration additional to water notionally present when R is H, and having an X-ray powder diffraction pattern substantially as set out in Table 1 (as determined by standard technique using copper K$\alpha$ radiation) and substantially as shown in FIG. 1.

TABLE 1

| As synthesised EU-12 | | Calcined EU-12 | |
|---|---|---|---|
| d(A) | I/Io | d(A) | I/Io |
| 14.3 | 6 | 14.3 | 3 |
| 11.2 | 40 | 11.2 | 19 |
| 8.93 | 14 | 8.95 | 16 |
| 7.58 | 19 | 7.60 | 15 |
| 7.23 | 31 | 7.21 | 29 |
| 6.70 | 30 | 6.69 | 29 |
| 5.91 | 6 | 5.88 | 4 |
| 5.62 | 21 | 5.62 | 21 |
| 5.51 | 10 | 5.53 | 12 |
| 4.93 | 19 | 4.93 | 16 |
| 4.60 | 46 | 4.59 | 30 |
| 4.48 | 34 | 4.49 | 33 |
| 4.20 | 57 | 4.21 | 26 |
| 3.81 | 52 | 3.82 | 36 |
| 3.73 | 8 | 3.73 | 9 |
| 3.62 | 49 | 3.62 | 31 |
| 3.55 | 73 | 3.54 | 66 |
| 3.44 | 9 | 3.44 | 6 |
| 3.35 | 100 | 3.35 | 100 |
| 3.21 | 37 | 3.22 | 35 |
| 3.10 | 57 | 3.10 | 60 |
| 2.980 | 10 | 2.995 | 8 |
| 2.954 | 22 | 2.949 | 20 |
| 2.914 | 17 | 2.911 | 15 |
| 2.868 | 10 | 2.887 | 8 |
| 2.816 | 7 | 2.816 | 6 |
| 2.762 | 10 | 2.769 | 9 |
| 2.646 | 8 | 2.646 | 7 |
| 2.544 | 5 | 2.549 | 6 |
| 2.493 | 5 | 2.489 | 2 |
| 2.456 | 7 | 2.463 | 6 |
| 2.413 | 12 | 2.419 | 6 |
| 2.305 | 10 | 2.345 | 1 |
| | | 2.305 | 6 |
| | | 2.282 | 4 |

This definition includes both freshly prepared EU-12 ("freshly prepared" means the product of synthesis and washing, with optional drying, as hereinafter described) and also forms of the zeolite resulting from dehydration and/or calcination and/or ion exchange. In freshly prepared EU-12, R may include an alkali metal cation, preferably rubidium, and/or ammonia and hydrogen and may include nitrogen-containing organic compounds as described below. These organic components are hereinafter referred to, for convenience only, as A.

As EU-12 is a zeolite, the organic component(s) must be held within the zeolite framework. It (they) can be removed by thermal or oxidative degradation or by displacement by suitable small molecules. Reference to Table 1 will show that the differences between X-ray diffraction patterns for as synthesised EU-12 and calcined EU-12 (the calcination was carried out at 550° C. for 30 hours) are relatively small. This shows that the alumino-silicate framework is thermally stable. Calcination at 900° C. for 3 hours was also found to have no effect on the diffraction pattern and it is believed that the thermal stability of zeolite EU-12 is very high.

The nitrogen-containing organic material does not constitute part of the comparison for the purposes of definition. Thus, a zeolite EU-12 as made typically has the molar composition:

0 to 2.0 $M_2O$ : 0 to 300 A : $Y_2O_3$ : at least 5 $XO_2$ : 0 to 1000$H_2O$ where M is an alkali metal, ammonium or hydrogen and A represents the organic compound. When the organic material is a quaternary compound, "A" refers to the compound defined as its oxide.

In calcined forms of zeolite EU-12, R may be any cation including hydrogen since the organic component is either burnt out in the presence of air, leaving hydrogen as the other balancing cation, or it is removed prior to calcination for example by dissolution in water or an organic solvent. The zeolite is readily converted to the hydrogen form by ion exchange with hydrogen ions and/or with ammonium ions followed by calcination.

Zeolite EU-12 may be prepared by reacting an aqueous mixture containing sources of at least one oxide $XO_2$, at least one oxide $Y_2O_3$ and at least one organic compound selected from (a) at least one methylated quaternary ammonium or methylated quaternary phosphonium compound;
(b) primary, secondary, tertiary and cyclic amines;
(c) mixtures of primary, secondary and tertiary alcohols with one or more compounds selected from groups (a) and (b)

the reaction mixture having the molar composition:

$XO_2/Y_2O_3$ in the range 5 to 5,000, preferably 10 to 600, more preferably 10 to 120

$M^1OH/XO_2$ in the range 0.1 to 1.0, preferably 0.15 to 0.65

$H_2O/XO_2$ in the range 10 to 100, preferably 25 to 75

$A/XO_2$ in the range 0.01 to 0.5, preferably 0.05 to 0.25

$M^2Z/XO_2$ in the range 0 to 0.5, preferably 0 to 0.25 wherein each of $M^1$ and $M^2$ represents an alkali metal, preferably rubidium, ammonium or hydrogen, or $M^2$ represents a methylated quaternary ammonium or phosphonium ion, A represents the organic compound, X and Y have the meanings as hereinbefore defined, and Z represents an acid radical.

Preferred compounds of group (a) are tetramethylammonium compounds, for example the hydroxide and bromide. Other compounds which the Applicants believe to be suitable are those of formula $RN(CH_3)_3$ where R is ethyl, propyl or butyl.

A preferred compound of group (b) is trimethylamine either alone or with alkyl halides RX where X is chloride, bromide or iodide and R is typically methyl. Typical mixtures of group (c) for use in the method of the invention include for example, trimethylamine with an alcohol ROH where R is an alkyl group, for example methyl.

Suitable alkali metals for use in the method of the invention include sodium, potassium, rubidium and caesium and of these it is preferred to use rubidium. Optionally, the reaction mixture may include more than one alkali metal, for example mixtures of rubidium and potassium compounds or mixtures of potassium and caesium compounds.

The Applicants have also found that EU-12 can be nucleated in reaction mixtures based on one alkali metal, for example rubidium, and grown in a system containing another alkali metal, for example potassium or caesium.

The preferred oxide $XO_2$ is silica ($SiO_2$) and the preferred oxide $Y_2O_3$ is alumina ($Al_2O_3$).

The silica source can be any of those commonly considered for use in synthesising zeolites, for example powdered solid silica, silicic acid, colloidal silica or dissolved silica. Among the powdered silicas usable are precipitated silica, especially those made by precipitation from an alkali metal silicate solution, such as the type known as "KS 300" made by AKZO, and similar products, aerosil silicas, fume silicas such as "CAB-O-SIL" M5 and silica gels suitable in grades for use in reinforcing pigments for rubber or silicone rubber. Colloidal silicas of various particle sizes may be used, for example 10 to 15 or 40 to 50 microns, as sold under the Registered Trade Marks "LUDOX", "NALCOAG" and "SYTON". The usable dissolved silicas include commercially available waterglass silicates containing 0.5 to 6.0, especially 2.0 to 4.0, mols of $SiO_2$ per mol of alkali metal oxide, "active" alkali metal silicates as defined in UK Pat. No. 1,193,254, and silicates made by dissolving silica in alkali metal hydroxide or quaternary ammonium hydroxide or a mixture thereof.

The alumina source is most conveniently a soluble aluminate, but aluminium, an aluminium salt, for example the chloride, nitrate, or sulphate, an aluminium alkoxide or alumina itself, which should preferably be in a hydrated or hydratable form such as colloidal alumina, pseudoboehmite, boehmite, gamma alumina or the alpha or beta trihydrate can also be used.

The reaction mixture is conveniently reacted under autogeneous pressure, optionally with added gas, for example nitrogen, at a temperature in the range 80° to 250° C., until crystals of zeolite EU-12 form, which can be from 1 hour to many months depending on the reactant composition and the operating temperature. Agitation is optional, but is preferable since it assists homogenisation of the reaction mixture and reduces the reaction time. Seeding of the reaction mixture with EU-12 crystals can also be advantageous if EU-12 crystals dispersed in their mother liquor are used.

At the end of the reaction, the solid phase is collected on a filter and washed and is then ready for further steps such as drying, calcination and ion-exchange.

Any alkali metal ions present in the product of the reaction have to be at least partly removed in order to prepare the catalytically active hydrogen form of EU-12 and this can be done by ion exchange with an acid, especially a strong mineral acid such as hydrochloric acid or by way of the ammonium compound made by ion exchange with a solution of an ammonium salt such as ammonium chloride. Ion exchange can be carried out by slurrying once or several times with the ion-exchange solution. The zeolite is usually calcined after ion exchange but this may be effected before ion-exchange or during ion-exchange if the latter is carried out in a number of stages. Ion exchange can also be used to replace ions present in the "as made" form of the zeolite by other ions and this ion-exchanged form of the zeolite can also be converted, if desired, to the hydrogen form as described above. For example, the Applicants have found that if EU-12 which has been prepared from a reaction mixture containing rubidium and calcined is consecutively ion-exchanged with IM ammonium chloride (for 16 hours then washed, filtered, calcined and equilibrated) and IM hydrochloric acid (for 4 hours then washed, filtered, dried and equilibrated), the X-ray pattern is left intact but with successive increases in peak intensity consistent with removal of the heavy rubidium cations.

Organic material incorporated in the zeolite during the synthesis can be removed by heating at temperatures up to 1,500° C. under atmospheric pressure or by heating at lower temperatures, under reduced pressure. Alternatively, organic material may be removed by dissolution in water or in a suitable organic solvent, if desired during ion-exchange.

Zeolite EU-12 prepared by the method of the invention is useful as a catalyst for example in the conversion of alcohols, especially methanol, to lower olefins and as a sorbent.

FIG. 1 illustrates a typical X-ray powder diffraction patern for zeolite EU-12.

The zeolite and its method of preparation are illustrated by the following Examples.

EXAMPLE 1

EU-12 was synthesised from a reaction mixture having the molar composition:

60 $SiO_2$:$Al_2O_3$:10 $Rb_2O$:5$TMA_2O$:3013 $H_2O$ which was prepared as follows:

An aluminate solution was prepared by dissolving 1.04 g of alumina trihydrate in a solution of 16.06 g of rubidium hydroxide monohydrate dissolved in 15 g of distilled water in a beaker using a magnetic stirrer hot plate. This aluminate solution was then added to a mixture of 24.0 g CAB-O-SIL M5 silica, 24.4 g of a 25% aqueous solution of tetramethylammonium hydroxide and 300 g of water in a 1 liter plastic beaker. An additional 24 g of water was used to rinse the aluminate solution from the beaker and was added to the reaction mixture. The mixture was stirred with a spatula until it appeared to be homogeneous.

The synthesis mixture was then placed in a stainless steel autoclave in which it was stirred at 300 r.p.m. and allowed to react at 180° C. Crystallisation was complete in 100 hours.

The zeolite was then filtered from the reaction mixture, washed with distilled water and dried at 120° C. and calcined as specified. Analysis of the products by X-ray powder diffraction showed that the resulting product was mainly EU-12 having the X-ray pattern shown in Table 1. A typical X-ray powder diffraction pattern for EU-12 is shown in FIG. 1.

EXAMPLES 2 to 6

The procedure of Example 1 was repeated using the molar reaction composition and conditions shown in Table 2.

TABLE 2

| Example | SiO$_2$ | Al$_2$O$_3$ | M$_2$O | (TMA)$_2$O | Other Reactants | H$_2$O | T/°C | Products[b] |
|---|---|---|---|---|---|---|---|---|
| 1 | 60 | 1 | 10 (Rb) | 5 | | 3013 | 180 | EU-12 + unidentified material which disappeared on calcination at 550° C. |
| 2 | 60 | 1 | 10 (Rb) | 5 | | 3013 | 200 | EU-12 + trace/minor P |
| 3 | 60 | 2 | 10 (Rb) | 5 | | 3013 | 180 | EU-12 |
| 4 | 60 | 2 | 15 (Rb) | 10[a] | | 3013 | 180 | EU-12 + extra very small peaks at 2θ = 9.3, 21.82, 27.23 |
| 5 | 60 | 3 | 10 (Rb) | 5 | | 3013 | 180 | EU-12 + minor/trace HS |
| 6 | 60 | 3 | 10 (K) | 5 | 10 RbBr | 3013 | 180 | EU-12 + Ferrierite |

[a]TMA (tetramethylammonium) added as TMABr. In all other examples TMAOH was used.
[b]P = zeolite P; HS = hydroxysodalite Samples of "as made" and calcined zeolite EU-12 were subjected to thermal gravimetric analysis. A calcined sample which had been ion-exchanged with IM hydrochloric acid for 2 hours was also examined. The traces for the three samples are shown in FIG. 2. The increase in capacity shown by the ion-exchanged sample shows that the rubidium ions present in the other two samples are readily exchangeable with hydrogen ions.

Samples of "as made" and calcined (600° C.) EU-12 were analysed by differential thermal analysis and the traces are shown in FIG. 3. The "as made" material exhibits a sharp exotherm at approximately 600° C. The calcined sample does not show this exotherm, but the "water loss" endotherm at about 100° C. is more marked than that for the "as made" sample.

FIG. 4 illustrates the differential thermal analysis (dta) and thermal gravimetric analysis (tga) traces for the "as made" EU-12 plotted on the same temperature scale. The sharp weight loss and the exotherm at 600° C. coincide showing that the removal of TMA is exothermic and that this process is the major thermal process in the temperature range 0° to 800° C. EU-12 is very easily calcined at 600° C. to give a pure white product.

The "as made" products of Examples 2 to 5 were analysed by X-ray fluoresence and the results are shown in Table 3.

TABLE 3

| | Composition % (w/w) | | | | | Total (including trace elements) | SiO$_2$/Al$_2$O$_3$ | |
|---|---|---|---|---|---|---|---|---|
| Example | SiO$_2$ | Al$_2$O$_3$ | Rb$_2$O | Na$_2$O | K$_2$O | | Gel | Product |
| 2 | 80.74 | 4.19 | 15.32 | 0.078 | 0.096 | 100.6 | 60 | 32.8 |
| 3 | 82.48 | 7.59 | 11.29 | 0.103 | 0.052 | 101.65 | 30 | 18.5 |
| 4 | 85.60 | 7.00 | 8.10 | −0.013 | 0.005 | 100.825 | 30 | 20.8 |
| 5 | 79.80 | 9.86 | 11.31 | 0.069 | 0.204 | 101.31 | 20 | 13.8 |

All of these samples, except that from Example 3, were slightly contaminated with other materials and their analyses, therefore, have been used with circumspection. The exmpirical formula of the "as made" EU-12 prepared in Example 3 based on X-ray fluoresence and thermal gravimetric analyses is: 18.5 SiO$_2$:Al$_2$O$_3$:0.81 Rb$_2$:0.56 (TMA)$_2$O:1.5 H$_2$O.

Electron micrographs of zeolite EU-12 show that the crystals are rod-shaped, being about 1 to 3 μm long and 0.1 to 0.3 μm in diameter.

We claim:

1. A crystalline zeolite material, EU-12, having a molar composition (in terms of mole ratios of oxides) expressed by the formula:

0.5 to 2.0 R$_2$O:Y$_2$O$_3$:at least 5 XO$_2$:0 to 1000 H$_2$O wherein R is a monovalent cation of 1/n of a cation of valency n, X is silicon and/or germanium, Y is one or more of aluminium, iron chromium, vanadium, molybdenum, arsenic, antimony, manganese, gallium or boron and H$_2$O is water of hydration additional to water notionally present when R is H, and having an X-ray powder diffraction pattern as set out in Table 1 (as determined by standard technique using copper Kα radiation) and as shown in FIG. 1.

2. A crystalline zeolite material EU-12, as claimed in claim 1 wherein R is or includes an alkali metal cation, ammonium, hydrogen or a nitrogen-containing organic cation.

3. A crystalline zeolite material, EU-12, as claimed in claim 1, having, as freshly made, a molar composition expressed by the formula 0 to 2.0 M$_2$O:0 to 300A:Y$_2$O$_3$::at least 5 XO$_2$:0 to 1000 H$_2$O where M is an alkali metal, ammonium or hydrogen and A is nitrogen-containing organic cation.

4. A method of making the crystalline zeolite material, EU-12 as defined in claim 1, which comprises
preparing an aqueous mixture containing sources of at least one oxide XO$_2$, at least one oxide Y$_2$O$_3$ and at least one organic compound selected from tetramethylammonium compounds, the reaction mixture having the molar composition:

XO$_2$/Y$_2$O$_3$ in the range 5 to 5000
M$^1$OH/XO$_2$ in the range 0.1 to 1.0 H$_2$O/XO$_2$ in the range 10 to 100
A/XO$_2$ in the range 0.01 to 0.5
M$^2$Z/XO$_2$ in the range 0 to 0.5 wherein each of M$^1$ and M$^2$ represents rubidium, A represents the organic compound, X is selected from silicon and germanium and Y is one or more of aluminum, iron, chromium, vanadium, molybdenum, arsenic, antimony, manganese, gallium or boron, and Z represents an acid radical;
maintaining the mixture at a temperature of 80°–250° C. until crystals of EU-12 form and;
recovering EU-12 zeolite material.

5. A method as claimed in claim 4 wherein the reaction mixture has a molar composition in which
XO$_2$/Y$_2$O$_3$ in the range 10 to 600
M$^1$OH/X$_2$ in the range 0.15 to 0.65
H$_2$O/XO$_2$ in the range 25 to 75
A/XO$_2$ in the range 0.05 to 0.25
M$^2$Z/XO$_2$ in the range 0 to 0.25.

6. A catalyst comprising zeolite EU-12 as defined in claim 1.

* * * * *